Patented May 17, 1932

1,858,629

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

WATER INSOLUBLE AZODYESTUFFS

No Drawing. Application filed July 17, 1929, Serial No. 379,061, and in Germany July 25, 1928.

Our copending application Serial No. 379,060, filed July 17, 1929, relates to new azodyestuffs corresponding probably to the general formula:

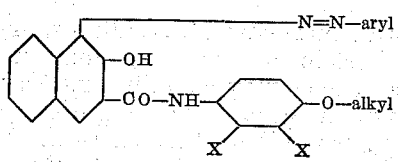

wherein one X means hydrogen and the other X a methyl group and aryl represents the residue of an aromatic diazotizable amino-compound not containing any groups, such as the sulfonic group or the carboxylic group, which would render the dyestuffs soluble in water or alkalies.

Our present invention relates to certain embodiments of the above mentioned series of azodyestuffs corresponding probably to the general formula:

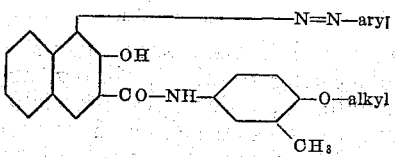

wherein aryl has the aforesaid signification, of which dyestuffs the following are illustrative examples. The parts are by weight and all temperatures in centigrade degrees; but we wish it to be understood that we are not limited to the particular products nor reaction conditions mentioned in the examples.

Example 1

14,2 parts of 4-chloro-2-toluidine are diazotized in the usual manner and the diazosolution is combined with a solution of 32,2 parts of 2.3-hydroxynaphthoyl-4-amino-2-methyl-1-methoxybenzene in a dilute caustic soda solution, to which Turkey red oil and an amount of sodium acetate sufficient for binding the excess of mineral acid are added. The separated dyestuff is filtered off and well washed. When mixed with the usual substrata it yields clear red color lakes of a very good fastness to light. The dyestuff corresponds probably to the formula:

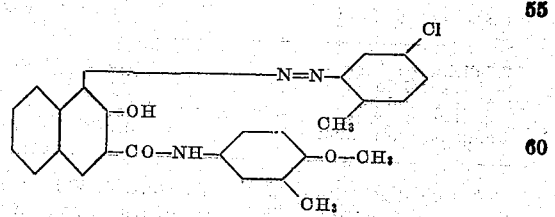

Example 2

Cotton yarn well boiled and dried is impregnated with a solution of 7 grs. of 2.3-hydroxynaphthoyl-4-amino-2-methyl-1-methoxybenzene, 14 ccs. of a caustic soda solution of 34° Bé. and 10 ccm. of Turkey red oil in the liter, well wrung out and developed with a diazosolution, which contains 1,21 grs. of meta-xylidine and is neutralized with sodiumbicarbonate, rinsed and soaped while boiling. In this manner a clear red dyeing of a very good fastness to light and kier boiling is obtained. The dyestuff thus produced on the fiber corresponds probably to the formula:

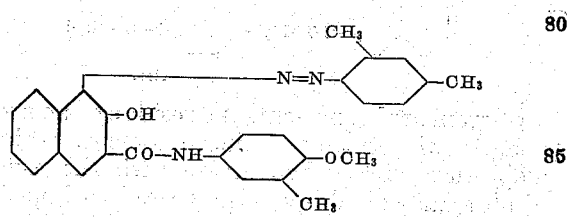

The following table gives the shades of some other dyestuffs derived from 2.3-hydroxynaphthoyl-4-amino-2-methyl-1-methoxybenzene:

| Diazocompound of: | Shade obtained: |
|---|---|
| m-chloroaniline | Scarlet red |
| 5-chloro-2-toluidine | Clear red |
| 4-chloro-2-anisidine | Claret |
| 5-bromo-2-toluidine | Scarlet |
| 4-bromo-2-toluidine | Yellowish red |
| 3-amino-4-chloro-acetophenone | Yellowish red |
| 3.5-dichloroaniline | Reddish brown |
| 2.5-dichloroaniline | Brownish red |
| 2.4.5-trichloroaniline | Claret |
| 2-amino-4-chlorodiphenylether | Clear red |
| 3-amino-4.6-dichlorotoluene | Full claret |
| 3-amino-4.5-dichlorotoluene | Reddish brown |
| o-nitroaniline | Reddish brown |
| 3-nitroaniline | Orange brown |
| 4-chloro-2-nitroaniline | Bluish claret |
| 5-chloro-2-nitroaniline | Claret |
| 2-chloro-4-nitroaniline | Claret |
| 3-amino-4-chloro-6-benzoylamino-toluene | Red |
| 3-nitro-4-toluidine | Bluish claret |
| 5-nitro-2-toluidine | Claret |
| 5-nitro-2-anisidine | Bluish claret |
| 3-nitro-4-anisidine | Bluish garnet |
| 1-aminoanthraquinone | Full yellowish red |
| 1-amino-4-chloro-anthraquinone | Bluish claret |
| 1-amino-5-chloroanthraquinone | Claret |
| 1-amino-4-benzoylamino-anthraquinone | Full garnet |
| 1-amino-5-benzoylamino-anthraquinone | Brownish claret |
| 4-amino-2.3'-dichloro-5.6'-dimethoxy-azobenzene | Dark bluish red |
| 4-amino-4'-nitro-2.5-dimethoxyazo-benzene | Bluish black |
| 2-phenetol-azo-α-naphthylamine | Reddish black |

Derived from 2.3-hydroxynaphthoyl-4-amino-2-methyl-1-ethoxy-benzene:

| Diazocompound of: | Shade obtained: |
|---|---|
| 2.5-dichloroaniline | Orange brown |
| 5-nitro-2-toluidine | Claret |
| 3-nitro-4-toluidine | Claret |
| 5-nitro-2-anisidine | Garnet |
| 1-amino-anthraquinone | Brownish claret |

Since an object of the present invention is to provide dyestuffs of good fastness properties, which dyestuffs are insoluble in water and alkalies, it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are the sulfonic acid, the carboxylic acid and the hydroxy group.

We claim:

1. As new compounds azodyestuffs corresponding probably to the general formula:

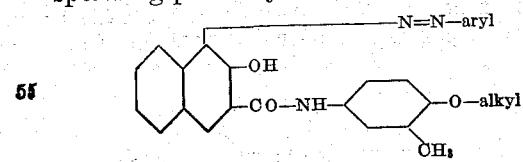

wherein aryl represents the residue of an aromatic diazotizable aminocompound, which dyestuffs yield when mixed with the usual substrata valuable orange to red to blue to black color lakes and orange to red to blue to black dyeings fast to light when produced on the fiber.

2. As new compounds azodyestuffs corresponding probably to the general formula:

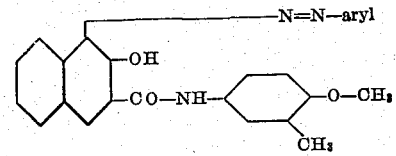

wherein aryl represents the residue of an aromatic diazotizable aminocompound, which dyestuffs yield when mixed with the usual substrata valuable orange to red to blue to black color lakes and orange to red to blue to black dyeings fast to light when produced on the fiber.

3. As new compounds azodyestuffs corresponding probably to the general formula:

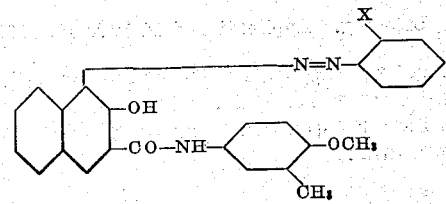

wherein X means an alkyl, alkoxy, aryloxy or nitro group or a halogen atom and this benzene nucleus may contain a further substituent of the group consisting of alkyl, alkoxy, aryloxy, nitro or halogen, which dyestuffs yield when mixed with the usual substrata valuable orange to red to blue to black color lakes and orange to red to blue to black dyeings fast to light when produced on the fiber.

4. As new compounds azodyestuffs corresponding probably to the general formula:

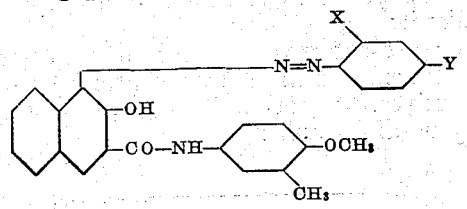

wherein X and Y mean substituents of the group consisting of alkyl, alkoxy, aryloxy, nitro or halogen, which dyestuffs yield when mixed with the usual substrata valuable orange to red to blue to black color lakes and orange to red to blue to black dyeings fast to light when produced on the fiber.

5. As new compounds azodyestuffs corresponding probably to the general formula:

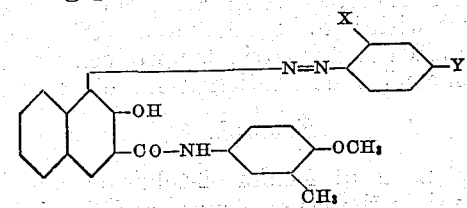

wherein X and Y mean substituents of the group consisting of alkyl, oxalkyl, halogen and $NO_2$, which dyestuffs yield when mixed with the usual substrata valuable orange to red to blue to brownish color lakes and orange to red to blue to black dyeings fast to light when produced on the fiber.

6. As new compounds azodyestuffs corresponding probably to the general formula:

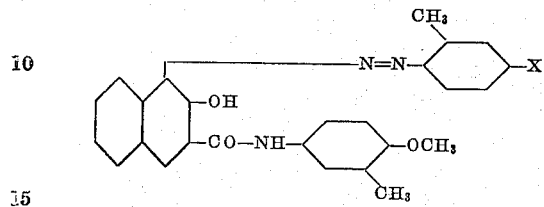

wherein X means a substituent of the grouping, consisting of $CH_3$, halogen and $NO_2$, which dyestuffs yield when mixed with the usual substrata valuable orange to bluish red color lakes and orange to bluish red dyeings fast to light when produced on the fiber.

7. As a new compound the azodyestuff corresponding probably to the formula:

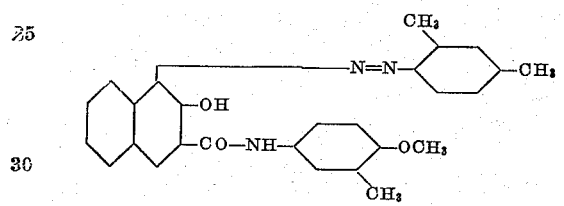

which dyestuff yield a clear red dyeing of a very good fastness to light and kier boiling.

In testimony whereof, we affix our signatures.

LEOPOLD LASKA.
ARTHUR ZITSCHER.